US008869668B1

(12) United States Patent
Hotek et al.

(10) Patent No.: US 8,869,668 B1
(45) Date of Patent: Oct. 28, 2014

(54) PRODUCT CUTTER

(75) Inventors: John P. Hotek, Austin, MN (US); Allan D. Olson, Osage, IA (US); Patrick Filbrandt, Antigo, WI (US); Matthew L. Solomonson, Hayward, MN (US)

(73) Assignee: Hormel Foods Corporation, Austin, MN (US)

(*) Notice: Subject to any disclaimer, the term of this patent is extended or adjusted under 35 U.S.C. 154(b) by 165 days.

(21) Appl. No.: 13/300,095

(22) Filed: Nov. 18, 2011

(51) Int. Cl.
*B26D 7/06* (2006.01)
*B23D 25/00* (2006.01)
*B27B 5/34* (2006.01)

(52) U.S. Cl.
USPC .......... 83/425.4; 83/425; 83/437.1; 83/508.3; 83/932

(58) Field of Classification Search
CPC ..................... B26D 7/2635; B26D 2007/2657; B26D 5/02
USPC ........... 83/884–887, 870–873, 302, 407, 425, 83/425.2, 425.3, 425.4, 426, 428, 433, 83/495, 498, 500–502, 504, 505, 508.2
See application file for complete search history.

(56) References Cited

U.S. PATENT DOCUMENTS 393,535 A * 11/1888 Brown ............................ 83/499
801,036 A * 10/1905 McCorkindale ................ 83/499
1,192,350 A * 7/1916 Sather ............................. 83/157
1,323,425 A * 12/1919 Townsend ........................ 83/500
2,070,537 A * 2/1937 Matthews ......................... 83/288
2,493,244 A * 1/1950 Gustafson ........................ 30/307
2,652,788 A * 9/1953 Schoppee ........................ 225/96
3,003,403 A 10/1961 Goettsch
3,257,882 A * 6/1966 Lulie et al. ....................... 83/864
3,788,180 A * 1/1974 Potsch et al. ..................... 83/449
3,916,741 A 11/1975 Comstock et al.
4,077,291 A * 3/1978 Obenshain ....................... 83/499
4,341,136 A 7/1982 Parson
4,548,109 A * 10/1985 Tokuno et al. ................. 83/76.7
4,570,518 A * 2/1986 Burmeister et al. ............ 83/504
4,684,360 A 8/1987 Tokuno et al.
4,934,234 A 6/1990 Cavagna
5,057,068 A 10/1991 Capdeboscq
5,761,980 A 6/1998 Ima et al.
7,134,372 B2 * 11/2006 Flaherty et al. .............. 83/425.4
7,836,805 B2 11/2010 Freudinger et al.
8,210,079 B2 * 7/2012 Myers et al. ..................... 83/498
2001/0002560 A1 * 6/2001 Aoki ................................ 83/13
2003/0226435 A1 * 12/2003 Aoki ................................ 83/34
2004/0159693 A1 * 8/2004 Adachi et al. ..................... 225/3
2006/0162519 A1 * 7/2006 Pappas et al. ................ 83/425.4
2006/0185487 A1 * 8/2006 Li et al. ........................... 83/498
2011/0283855 A1 * 11/2011 Kwarta et al. ............... 83/425.4

* cited by examiner

*Primary Examiner* — Sean Michalski
*Assistant Examiner* — Jonathan G Riley
(74) *Attorney, Agent, or Firm* — IPLM Group, P.A.

(57) ABSTRACT

A product cutter that includes a plurality of blades, a conveyer, a cutting adjustment assembly and a frame is provided. The plurality of blades are designed to cut an elongated product into a plurality of cut product portions having generally equal lengths. The plurality of blades includes a pair of outer blades and at least one inner blade positioned between the outer blades. The conveyor is used to move the elongated product to the blades. The cutting adjustment assembly is configured and arranged to adjust distances between the respective blades while maintaining cut product portions of generally equal lengths. The at least one inner blade is held stationary in relation to the conveyer during activation of the cutting adjustment assembly. The frame is configured and arranged to hold at least the plurality of blades and the cutting adjustment assembly.

8 Claims, 3 Drawing Sheets

PRODUCT CUTTER

BACKGROUND

Food products are typically sold to consumers by providing a select amount of product per product package. To automate the process of packaging products, automated product sizing machines have been developed to produce consistent product sizes to be placed in product packages. An example of an product sizing machine is a cutting machine that cuts a product to a size that has a select weight. For some products, variation between product batches makes it difficult to cut the product to a size that has a consistent weight between batches.

For the reasons stated above and for other reasons stated below which will become apparent to those skilled in the art upon reading and understanding the present specification, there is a need in the art for a device that effectively and efficiently can be adjusted to account for variations in product batches to achieve consistent product weights.

SUMMARY OF INVENTION

The above-mentioned problems of current systems are addressed by embodiments of the present invention and will be understood by reading and studying the following specification. The following summary is made by way of example and not by way of limitation. It is merely provided to aid the reader in understanding some of the aspects of the invention.

In one embodiment, a product cutter is provided. The product cutter includes a plurality of blades, a conveyer, a cutting adjustment assembly and a frame. The plurality of blades are designed to cut an elongated product into a plurality of cut product portions having generally equal lengths. The plurality of blades includes a pair of outer blades and at least one inner blade positioned between the outer blades. The conveyor is used to move the elongated product to the blades. The cutting adjustment assembly is configured and arranged to adjust distances between the respective blades while maintaining cut product portions of generally equal lengths. The at least one inner blade is held stationary in relation to the conveyer during activation of the cutting adjustment assembly. The frame is configured and arranged to hold at least the plurality of blades and the cutting adjustment assembly.

In another embodiment, yet another product cutter is provided. The product cutter includes a blade drive shaft, a plurality of blades, an adjustment assembly and a product guide. The blade drive shaft motor is coupled to rotate the blade drive shaft. The plurality of blades are received on the blade drive shaft. Each blade is configured and arranged to lock onto the rotation of the blade drive shaft. The plurality of blades include a pair of outer blades and a plurality of inner blades positioned between the pair of outer blades. The inner blades include a static blade that is configured and arranged to remain at a static location in relation to the blade drive shaft. An adjustment assembly is configured and arranged to move the pair of outer blades and at least one inner blade along a length of the blade drive shaft to adjust cut locations of an elongated product. The product guide is configured and arranged to engage an end of the elongated product in order to position the elongated product in relation to the plurality of blades. The adjustment assembly is configured and arranged to move the product guide when the adjustment assembly moves the pair of outer blades and the at least one inner blades along the length of the blade drive shaft.

In another embodiment, yet still another product cutter is provided. The product cutter includes a blade drive shaft, a blade drive shaft motor, a plurality of blades, and an adjustment assembly and a product guide. The blade drive shaft motor is coupled to rotate the blade drive shaft. The plurality of blades are received on the blade drive shaft. Each blade is configured and arranged to lock onto the rotation of the blade drive shaft. The plurality of blades including a pair of outer blades and a plurality of inner blades are positioned between the pair of outer blades. The inner blades include a static blade that is configured and arranged to remain at a static location in relation to the blade drive shaft. The adjustment assembly is configured and arranged to move the pair of outer blades and at least one inner blade along a length of the blade drive shaft to adjust cut locations of an elongated product.

The adjustment assembly includes an adjusting wheel, a first gear, a first adjusting shaft, a second gear, a second adjusting shaft, a third gear, a third adjusting shaft and a blade adjusting member for each of the pair of outer blades and the at least one inner blade. The adjustment wheel is configured and arranged to be rotated by an operator. The first gear has a first diameter and is rotationally coupled to the adjustment wheel. The first adjustment shaft is rotationally coupled to the first gear. The first adjustment shaft has at least two spaced opposably orientated first and second outer threaded portions. The second gear has a second diameter. The second gear is rotationally engaged to the first gear. The second adjustment shaft is rotationally coupled to the second gear. The second adjustment shaft has at least two spaced opposably orientated third and fourth outer threaded portions. The third gear has a third diameter and is rotationally engaged to the second gear. The first diameter of the first gear is different than the second diameter of the second gear and the third diameter of the third gear and the second diameter of the second gear is different than the third diameter of the third gear. The third adjustment shaft is rotationally coupled to the third gear. The third adjustment shaft has at least two spaced opposably orientated fifth and sixth outer threaded portions. The blade adjustment members are configured and arranged to move associated blades along the length of the blade drive shaft. Each adjustment member has a first portion that is threadably engaged with an outer threaded portion of an associated one of the first, second and third adjusting shafts and a second portion coupled to an associated blade. A product guide is configured and arranged to engage an end of the elongated product to position the elongated product in relation to the plurality of blades. The adjustment assembly is configured and arranged to move the product guide when the adjustment assembly moves the pair of outer blades and the at least one inner blade along the length of the blade drive shaft.

BRIEF DESCRIPTION OF THE DRAWINGS

The present invention can be more easily understood and further advantages and uses thereof will be more readily apparent, when considered in view of the detailed description and the following figures in which.

In accordance with common practice, the various described features are not drawn to scale but are drawn to emphasize specific features relevant to the present invention. Reference characters denote like elements throughout Figures and text.

DETAILED DESCRIPTION

In the following detailed description, reference is made to the accompanying drawings, which form a part hereof, and in which is shown by way of illustration specific embodiments in which the inventions may be practiced. These embodiments are described in sufficient detail to enable those skilled in the art to practice the invention, and it is to be understood that other embodiments may be utilized and that changes may be made without departing from the spirit and scope of the present invention. The following detailed description is, therefore, not to be taken in a limiting sense, and the scope of the present invention is defined only by the claims and equivalents thereof.

Embodiments of the present invention provide a product cutter 100 that is designed to cut an elongated product into cut product portions with a plurality of blades 104-1 through 104-6. In embodiments of the present invention, spacing between the blades 104-1 through 104-6 can be simultaneously adjusted to cut multiple uniform lengths from the elongated product. An example of an elongated product includes, but is not limited to, pepperoni sticks. In the pepperoni example, the manufacturing variables may cause the same lengths of products made from different batches to be of different weights. Hence, an effective way to change the lengths of cuts to the elongated product is needed.

Figure 1:
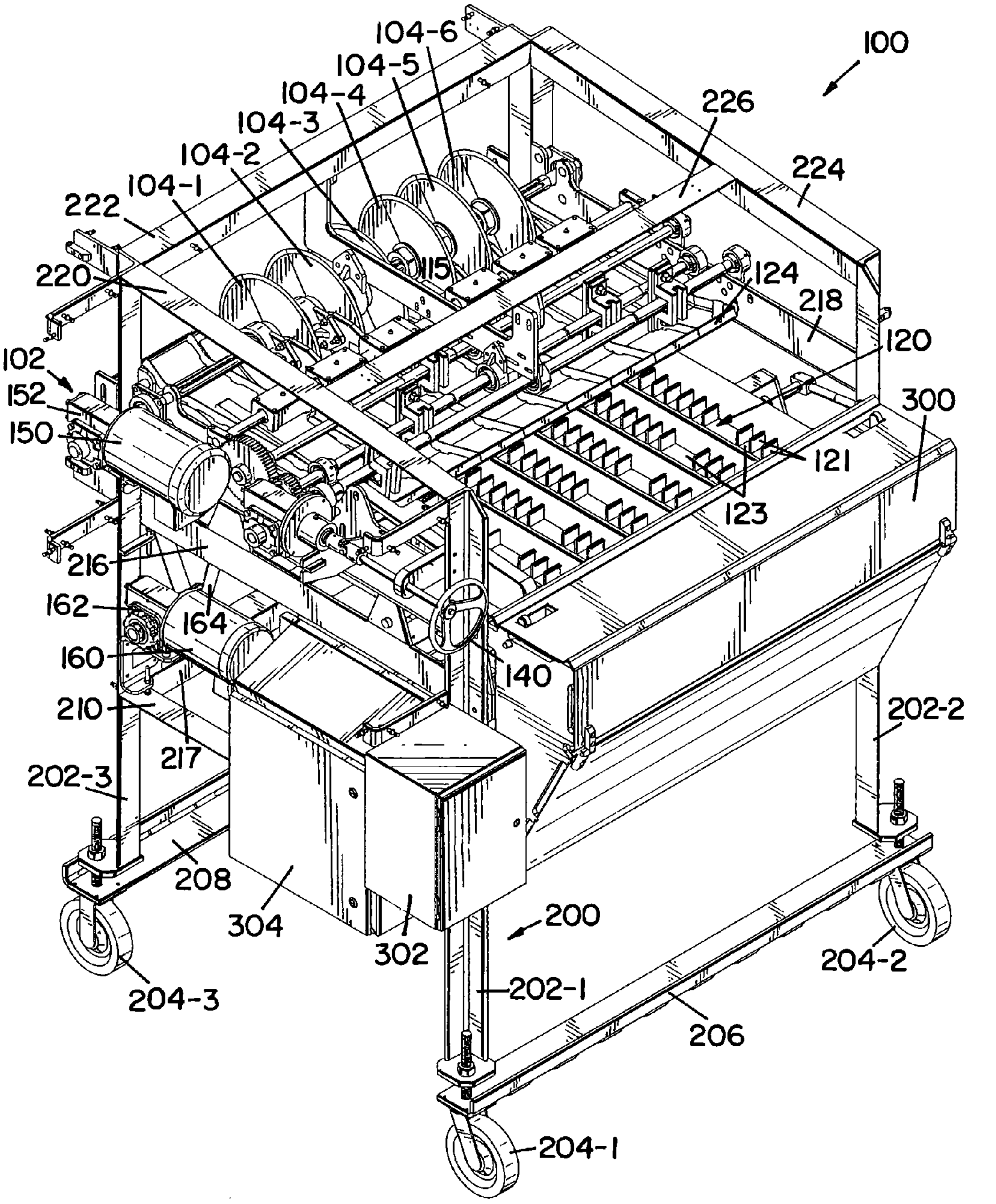
FIG. 1 is a front perspective view of a product cutter of one embodiment of the present invention.
Figure 2:
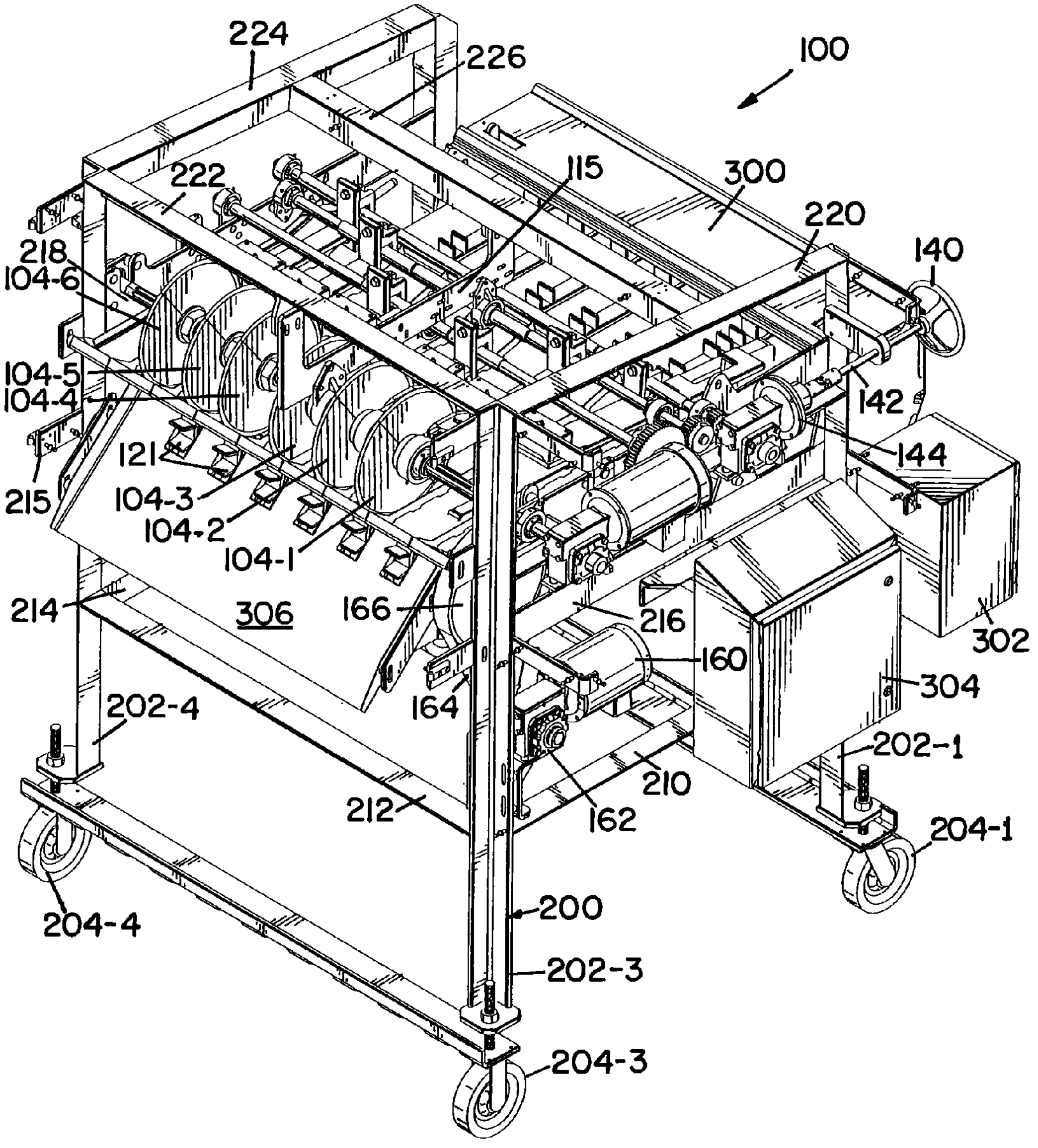
FIG. 2 is a back perspective view of the product cutter of FIG. 1.
Figure 3:
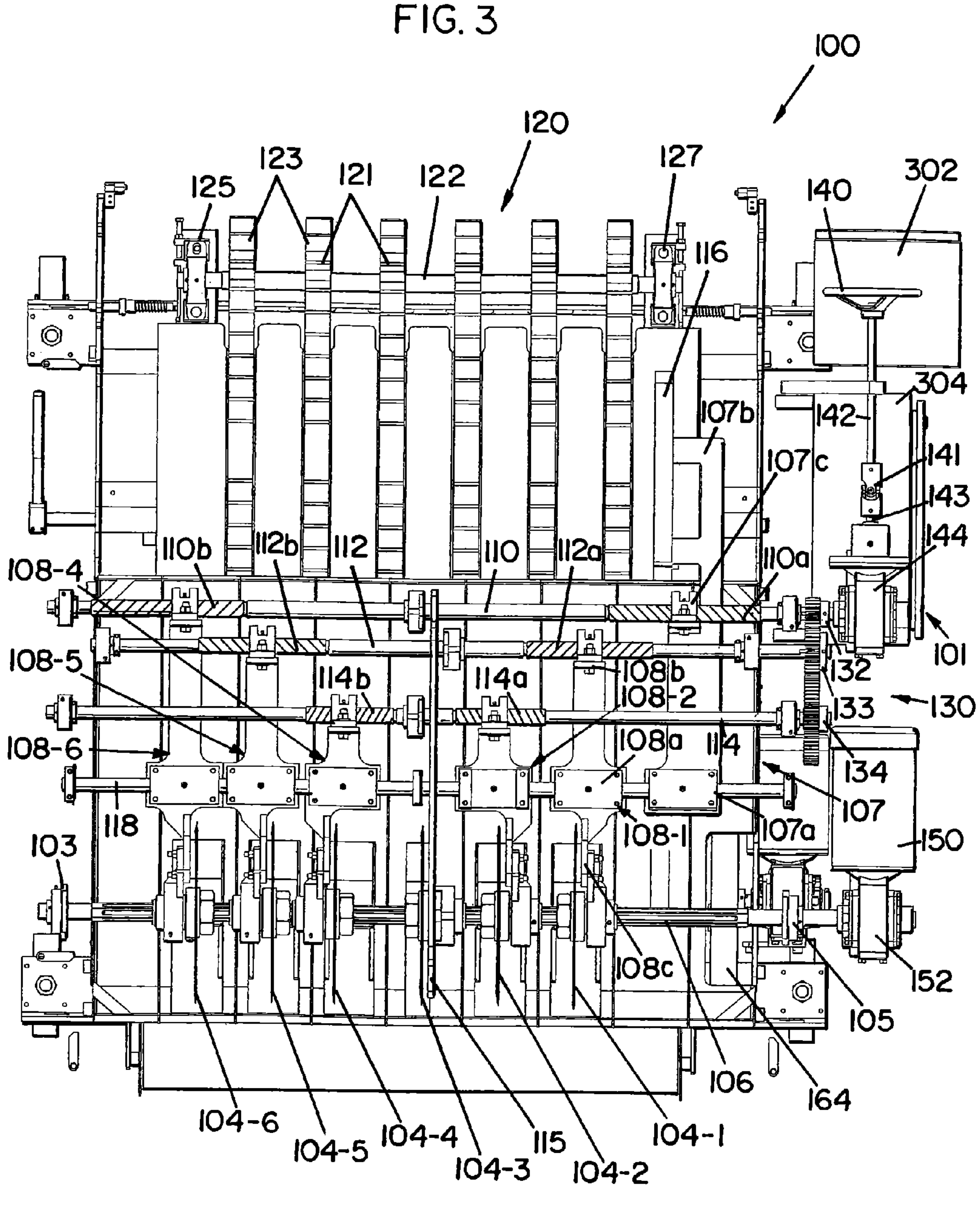
FIG. 3 is a top view of the product cutter of FIG. 1.

An embodiment of the product cutter 100 is illustrated in FIGS. 1 through 3 and is described below in light of the Figures. In particular, FIG. 1 illustrates a front perspective view of the product cutter 100, FIG. 2 illustrates a back perspective view of the product cutter 100 and FIG. 3 illustrates a top view of the product cutter 100. The product cutter is herein described in view of FIGS. 1 through 3. The product cutter 100 is mounted to a frame 200. Frame 200, in this embodiment, includes a lower horizontal front support 206 and a lower horizontal rear support 208. Wheels 204-1 through 204-4 are coupled proximate opposed ends of the respective lower horizontal front support 206 and the lower horizontal rear support 208. The wheels 204-1 through 204-4 allow the product cutter 100 to be mobile. Extending up proximate the opposed ends of the respective lower horizontal front support 206 and the lower horizontal rear support 208 are respective vertical supports 202-1 through 202-4. Spacing the lower horizontal front support 206 from the lower horizontal rear support 208 is done with a plurality of horizontal supports 210, 216, 220 that are coupled between vertical supports 202-1 and 202-3 and horizontal supports 214, 215, and 224 that are coupled between respective vertical supports 202-2 and 202-4. The frame 200 further includes horizontal supports 212 and 222 which are coupled between vertical supports 202-3 and 202-4 and a horizontal support 226 that is coupled between horizontal supports 220 and 224. Components of the product cutter 100 are coupled to the frame 200.

The product cutter 100 includes a conveyor system 120. The conveyor system 120 includes a plurality of spaced conveyor tracks 123 that extends between a conveyor drive shaft (not shown) and a front rotating conveyor shaft 122 illustrated in FIG. 3. The spaced conveyor tracks 123 are, in one embodiment, endless looped belts. Ends of the front rotating conveyor shaft 122 are received in respective front conveyer bearing assemblies 125 and 127 which allow rotation of the rotating conveyor shaft 122. The bearing assemblies 125 and 127 are respectfully coupled to the frame 200. The conveyor drive shaft is rotationally coupled to a first pulley 166 as best shown in FIG. 2. A belt 164 ties rotation of the first pulley 166 with rotation of a second pulley (not shown). The second pulley is coupled to a conveyor motion transfer assembly 162. A conveyor motor 160 is coupled to provide rotation to the conveyor motion transfer assembly 162 which in turn rotates the second pulley. Rotation of the second pulley in turn rotates the first pulley 166 via belt 164. The first pulley 166 in turn rotates the conveyor drive shaft. Rotation of the conveyor drive shaft rotates the front rotating conveyor shaft 122 via the spaced conveyor tracks 123. The spaced conveyor tracks 123 include a plurality of divider tabs 121 that are arranged to form rows in which the elongated product is received as best shown in FIG. 1. The spaced conveyor tracks 123 along with the divider tabs 121 move the elongated products to blades 104-1 through 104-6 which cut each elongated product into cut product portions of generally equal lengths. Once the elongated product is cut into the cut product portions they are discharged from the product cutter 100 via discharge guide plate 306 illustrated in FIG. 2. The cut product portions can then be gathered in a bin, or the like, and then be packaged for sale.

The blades 104-1 through 104-6 are rotationally coupled to a blade drive shaft 106. Blade drive shaft 106 is rotationally coupled to the frame 200 via spaced blade bearing assemblies 103 and 105. An end of the blade drive shaft 106 is rotationally coupled to a blade motion transfer assembly 152. A blade motor 150 provides rotational movement for the blade motion transfer assembly 152 which rotates the blade drive shaft 106. Blades 104-1, 104-2, 104-4, 104-5 and 104-6 each have a central passage (not shown) that are shaped to lock on to the cross-sectional shape of the blade drive shaft 106 to lock rotation of the blades 104-1, 104-2, 104-4, 104-5 and 104-6 with the rotation of the blade drive shaft 106 while allowing transverse movement relative to the rotational axis of the blade drive shaft 106 along a length of the blade drive shaft 106. Although, blades 104-1, 104-2, 104-4, 104-5 and 104-6 can move transverse to the rotational axis of the blade drive shaft 106, blade 104-3, in the embodiment shown, is coupled in a static position proximate a central support plate 115. Although, blade 104-3 is locked onto the rotation of the blade drive shaft 106, it is held in the static location in relation to the drive shaft 106 via the coupling to the central support plate 115. As illustrated in the top view of FIG. 3, the central support plate 115 is generally centrally located in the product cutter 100 with the first and second blades 104-1 and 104-2 on one side and the third, fourth, fifth and sixth blades 104-3 through 104-6 on another side.

Blades 104-1, 104-2, 104-4, 104-5 and 104-6 are each coupled to a respective blade adjustment member 108-1, 108-2, 108-4, 108-5 and 108-6. The blade adjustment members 108-1, 108-2, 108-4, 108-5 and 108-6 selectively move the blades 104-1, 104-2, 104-4, 104-5 and 104-6 along the length of the blade drive shaft 106. Each of the blade adjustment members 108-1, 108-2, 108-4, 108-5 and 108-6 includes a base guide portion **108*a* that includes a passage (not shown) that receives a guide rod 118. The guide rod 118 is coupled across a width of the frame 200. Each blade adjustment member 108-1, 108-2, 108-4, 108-5 and 108-6 further includes a blade attaching portion 108*c* that extends from the base guide portion 108*a*. The blade attaching portion 108*c* is coupled to a respective blade 104-1, 104-2, 104-4, 104-5 and 104-6. Each blade adjustment member 108-1, 108-2, 108-4, 108-5 and 108-6 further includes an adjustment shaft attaching portion 108*b* that extends from the base guide portion 108*a* in an opposite direction as the blade attaching portion 108*c*. Each adjustment shaft attaching portion 108*b* includes a threaded inner passage (not shown) that threadably engages outer threads on respective adjusting shafts 110, 112 and 114** described below.

In the embodiment of the product cutter 100 shown in FIGS. 1 through 3, three adjustment shafts 110, 112 and 114 are used. Each adjustment shaft 110, 112 and 114 includes a pair of spaced outer threaded portions. In particular, the first adjustment shaft 110 includes spaced outer threaded portions

110*a* and 110*b*. The orientation of the threads in the outer threaded portions 110*a* and 110*b* are opposite each other. The inner threads of the adjustment shaft attaching portion 108*b* of the sixth blade adjustment member 108-6 is threadably coupled to the second outer threaded portion 110*b* of the first adjustment shaft 110. The product cutter 100 in this embodiment further includes a product guide 116 in which an end of the elongated product abuts when being transported by the conveyer 120 to the blades 104-1, 104-2, 104-3, 104-4, 104-5 and 104-6. The product guide 116 is adjustable in position similar to blades 104-1, 104-2, 104-4, 104-5 and 104-6. A guide adjustment member 107 is coupled to the product guide 116 to selectively adjust the position of the product guide 116. The guide adjustment member 107 includes a first portion 107*a* having a passage (not shown) that receives the guide rail 118 and a second portion 107*b* that is coupled to the product guide 116. The guide adjustment member 107 further has a central adjustment shaft attaching portion 107*c* that includes an inner threaded passage (not shown) that threadably engages the first outer threaded portion 110*a* of the first adjustment shaft 110. With the outer threads of the outer threaded portions 110*a* and 110*b* being in an opposite direction, rotation of the first adjustment shaft 110 causes the product guide 116 and sixth blade 104-6 to either move towards each other or away from each other depending on the direction of the rotation of the first adjusting shaft 110.

The second adjustment shaft 112 includes a first threaded portion 112*a* and a second threaded portion 112*b*. The inner threads of the adjustment shaft attaching portion 108*b* of the first blade adjustment member 108-1 is threadably coupled to the first outer threaded portion 112*a* of the second adjustment shaft 112. The inner threads of the adjustment shaft attaching portion 108*b* of the fifth blade adjustment member 108-5 is threadably coupled to the second outer threaded portion 112*b* of the second adjustment shaft 112. Similar to the outer threaded portions 110*a* and 110*b* discussed above, the outer threaded portions 112*a* and 112*b* are oppositely oriented such that when the second adjustment shaft 112 is rotated the first and fifth blades 104-1 and 104-5 move either away from each other or towards each other depending on the rotation direction of the second adjustment shaft 112.

The third adjustment shaft 114 includes a first threaded portion 114*a* and a second threaded portion 114*b*. The inner threads of the adjustment shaft attaching portion 108*b* of the second blade adjustment member 108-2 is threadably coupled to the first outer threaded portion 114*a* of the third adjustment shaft 114. The inner threads of the adjustment shaft attaching portion 108*b* of the fourth blade adjustment member 108-4 is threadably coupled to the second outer threaded portion 114*b* of the third adjustment shaft 114. Similar to the outer threaded portions 110*a* and 110*b* and 112*a* and 112*b* discussed above, the outer threaded portions 114*a* and 114*b* are oppositely oriented such that when the third adjustment shaft 114 is rotated, the second and fourth blades 104-2 and 104-4 move either away from each other or towards each other depending on the rotation direction of the second adjustment shaft 114. As discussed above, the third blade 104-3 is coupled to the central support plate 115 and does not move along a length of the blade drive shaft 106. Hence the third blade 104-3 is held stationary in relation to the frame 200 and conveyer 120.

The first, second and third adjustment shafts 110, 112 and 114 are selectively rotated by a gear set 130. The gear set 130, in the embodiment illustrated in FIGS. 1 through 3, includes a first gear 132, a second gear 133 and a third gear 134. The teeth of the first gear 132 engage the teeth of the second gear 133 and the teeth of the second gear engage the teeth of the third gear 134. Hence, when the first gear 132 is rotated, the second and third gears 133 and 134 are rotated. The first adjustment shaft 110 is rotationally coupled to the first gear 132. The second adjustment shaft 112 is rotationally coupled to the second gear 133 and the third adjustment shaft 114 is coupled to the third gear 134. The diameters of the first, second and third gears 132, 133 and 134 are all different in the embodiment shown in FIGS. 1 through 3. The diameters of the gears 132, 133 and 134 are selected to achieve desired movement of respective blades 104-1, 104-2, 104-4, 104-5 and 104-6 and the product guide 116. As illustrated in the Figures, the third gear 134 has a greater diameter than the second gear 133 which is in turn has a greater diameter than the first gear 132. Hence, the movement between blades 104-2 and 104-4 coupled to the third adjustment shaft 114 will move a shorter distance in relation to each other than blades 104-1 and 104-5 coupled to the second adjustment shaft 112. Likewise, the movement between blades 104-1 and 104-5 coupled to the second adjustment shaft 112 will move a shorter distance in relation to the product guide 116 and the sixth blade 104-6 coupled to the first adjustment shaft 110. This arrangement allows the gear set 130 to adjust the blades 104-1, 104-2, 104-4, 104-5 and 104-6 and the product guide 116 to cut the elongated product into generally equal length cut product portions. Also, the threads (thread spacing) on the outer thread portions 110*a*, 100*b*, 112*a*, 112*b*, 114*a* and 114*b* can be varied between respective adjustment shafts 110, 112 and 114 to vary distances of travel between respective blades 104-1, 104-2, 104-4, 104-5 and 104-6 and the product guide 116.

The gear set 130 is coupled to a wheel motion transfer assembly 144. In particular, the first gear 132 is rotationally coupled to the wheel motion transfer assembly 144. An adjusting wheel 140 is used by an operator to activate the gear set 130 to move the blades 104-1, 104-2, 104-4, 104-5 and 104-6 and the product guide 116. The adjusting wheel 140 is coupled to the gear set 130 via first adjustment rod 142 and second adjustment rod 143 that are coupled together via pivot coupler 141. In particular, a first end of the first adjustment rod 142 is coupled to the adjustment wheel 140 and a second end of the first adjustment rod 142 is coupled to the pivot coupler 141. A first end of the second adjustment rod 143 is coupled to the pivot coupler and a second end of the adjustment rod 143 is coupled to rotate the wheel motion transfer assembly 144. Hence, embodiments include a cutting adjustment assembly 101 that includes at least the blade adjustment members 108-1, 108-2, 108-4, 108-5 and 108-6, the product guide adjustment member 107, the first, second and third adjusting shafts 110, 112 and 114, the gear set 130 and the adjusting wheel 140. Referring back to FIG. 1, the product cutter 100 further includes a front cover 300 to prevent access to the conveyer 120 during operation of the product cutter 100. The product cutter 100 also includes an upper cover plate 124 that is positioned between the blade adjustment members 108-1 through 108-5 and the conveyer 120. Also coupled to the frame 200 is a control box 302 and a power box 304.

In operation, elongated products (such as pepperoni sticks) are placed in the respective rows formed by the divider tabs 120 on the conveyer tracks 123 with an end of each elongated product abutting the product guide 116. The conveyer tracks 123 then bring the elongated products to the blades 104-1 through 104-6. The blades 104-1 through 104-6 then cut each elongated product into cut product portions. The operator then weighs the cut product portions to determine if their weights are within a desired weight range for a cut product portion. If the cut product portions are not within the desired weight range, the product cutter 100 needs to be adjusted. The product cutter 100 is adjusted by rotating the adjusting wheel 140 which in turn rotates the gear set 130 which further in turn synchronously adjusts the spacing between the product guide 116 and the blades 104-1 through 104-6. As discussed above, adjustment of spacing is accomplished with inner blade 104-3 remaining stationary while the rest of the blades 104-1, 104-2, 104-4, 104-5 and 104-6 and the product guide 116 are moved. Hence, in embodiments, the pair of outer blades 104-1 and 104-6 are moved relative to the conveyer 120 while the inner blade 104-3 remains static in relation to the conveyer 120 when the adjustment assembly 101 is activated. Once, the product cutter 100 is adjusted, another elongated product is cut by the blades 104-1 through 104-6. The operator then once again weighs a cut product portion to see if it is within the desired weight range. If the weight of the cut product portion is not within the desired weight range, the adjusting wheel 140 is again turned and the process continues until the weight of the cut product portion is within the desired weight range. The direction the adjusting wheel 140 is turned depends upon whether the cut product portion weights too much or too little. Once the weight of the cut product portion is within the desired weight range, the product cutter 100 is ready for normal operation. At the start of cutting a new batch of elongated product, the weighing and adjusting procedures discussed above should again be implemented to ensure the weight of the cut product portions are within the desired weight range.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

The invention claimed is:

1. A product cutter comprising:

a plurality of blades to cut an elongated product into a plurality of cut product portions of generally equal lengths, the plurality of blades including a pair of outer blades and at least one inner blade positioned between the outer blades;

a conveyor to move the elongated product to the blades;

a cutting adjustment assembly configured and arranged to adjust distances between the plurality of blades while maintaining the cut product portions in generally equal lengths, such that one of the at least one inner blade is held stationary in relation to the conveyer during activation of the cutting adjustment assembly while the remaining blades of the plurality of blades are synchronously moved with a single adjustment that positions the plurality of blades in relation to each other to cut the product in the generally equal lengths;

wherein the cutting adjustment assembly further comprises an adjustment wheel; a gear set in rotational communication with the adjustment wheel such that when the adjustment wheel is rotated the gear set rotates; a plurality of adjustment shafts rotationally coupled to the gear set, each adjustment shaft having at least one outer threaded portion; and a plurality of adjustment members, each adjustment member having a first end that is threadably engaged with an outer threaded portion of an associated adjustment shaft, at least two of the adjustment members having a Second end coupled to an associated blade;

the gear set further including, a first gear having a first diameter, the first gear rotationally coupled to the adjustment wheel, a second gear having a second diameter, the second gear rotationally engaged to the first gear, and a third gear having a third diameter, the third gear rotationally engaged to the second gear, the first diameter of the first gear being different than the second diameter of the second gear and the third diameter of the third gear, further the second diameter of the second gear being different than the third diameter of the third gear; and the plurality of adjustment shafts further including, a first adjustment shaft rotationally coupled to the first gear, the first adjustment shaft having at least two spaced first and second outer threaded portions, a second adjustment shaft rotationally coupled to the second gear, the second adjustment shaft having at least two spaced third and fourth outer threaded portions, and a third adjustment shaft rotationally coupled to the third gear, the third adjustment shaft having at least two spaced fifth and sixth outer threaded portions;

and a frame configured and arranged to hold at least the plurality of blades and the cutting adjustment assembly.

2. The product cutter of claim 1, the frame further comprising: a central support plate, the at least one inner blade coupled to the central support plate to maintain the at least one inner blade in the stationary position in relation to the conveyer.

3. The product cutter of claim 1, further comprising: a product guide positioned to abut an end of the elongated product, the cutting adjustment assembly configured and arranged to move the product guide to adjust the distance between the product guide and at least one of the plurality of blades.

4. The product cutter of claim 1, further comprising: an orientation of the first outer threaded portion of the first adjustment shaft being different than an orientation of the second outer threaded portion of the first adjustment shaft so that respective adjustment members threadably engaged to the respective first and second outer threaded portions of the first adjustment shaft move in opposite directions when the first adjustment shaft is rotated; an orientation of the third outer threaded portion of the second adjustment shaft being different than an orientation of the fourth outer threaded portion of the second adjustment shaft so that respective adjustment members threadably engaged to the respective third and fourth outer threaded portions of the second adjustment shaft move in opposite directions when the second adjustment shaft is rotated; and an orientation of the fifth outer threaded portion of the third adjustment shaft being different than an orientation of the sixth outer threaded portion of the third adjustment shaft so that respective adjustment members threadably engaged to the respective fifth and sixth outer threaded portions of the third adjustment shaft move in opposite directions when the third adjustment shaft is rotated.

5. The product cutter of claim 1, further comprising: a guide rod coupled to the frame, each of the plurality of adjustment members being slidably coupled to the guide rod.

6. The product cutter of claim 1, further comprising: a blade drive shaft rotationally coupled to the frame, each blade coupled to rotate with the drive shaft; and a blade motor configured and arranged to rotate the blade drive shaft.

7. The product cutter of claim 6, further comprising: at least two of the blades configured and arranged to be selectively moved along a length of the blade drive shaft in response to the cutting adjustment assembly.

8. The product cutter of claim 1, wherein the conveyer further comprises: a plurality of conveyer tracks; and a plurality of divider tabs aligned in rows across the plurality of conveyer tracks to space elongated products.

* * * * *